United States Patent [19]

Baekgaard

[11] Patent Number: 5,291,346
[45] Date of Patent: Mar. 1, 1994

[54] RECORDING AND/OR PLAY-BACK SYSTEM EMPLOYING A CASSETTE WITH A MEMORY UNIT ACCOMMODATED IN THE CASSETTE

[75] Inventor: Knud E. Baekgaard, Struer, Denmark
[73] Assignee: Bang & Olufsen A/S, Struer, Denmark
[21] Appl. No.: 829,059
[22] PCT Filed: Aug. 7, 1990
[86] PCT No.: PCT/DK90/00199
§ 371 Date: Feb. 7, 1992
§ 102(e) Date: Feb. 7, 1992
[87] PCT Pub. No.: WO91/02355
PCT Pub. Date: Feb. 21, 1991

[30] Foreign Application Priority Data
Aug. 7, 1989 [DK] Denmark ............... 3854/89

[51] Int. Cl.⁵ .............. G11B 15/04; G11B 19/04
[52] U.S. Cl. ................................................ 360/60
[58] Field of Search ............. 360/66, 132, 13, 60, 360/62; 369/14

[56] References Cited
U.S. PATENT DOCUMENTS
4,338,644 7/1982 Staar ............................. 360/132
4,426,684 1/1984 Sechet et al. ............... 364/900 X
4,839,875 6/1989 Kuriyama et al. .............. 369/14
5,055,947 10/1991 Satoh ............................... 360/62

FOREIGN PATENT DOCUMENTS
0373718 6/1990 European Pat. Off. .
8910615 11/1989 World Int. Prop. O. .

*Primary Examiner*—Donald Hajec
*Assistant Examiner*—Patrick Wamsley
*Attorney, Agent, or Firm*—Antonelli, Terry, Stout & Kraus

[57] ABSTRACT

A video system which includes a recorder/player and cassette units adapted to be inserted into the recorder/player with the cassette units including a storing medium and with the cassette units being provided with memory units. The respective memory units are independent of the storing medium and are operable, in response to the cassette being inserted into the recorder/player, to be electrically connected to a read/write unit therein. The memory unit is accommodated in a block member adapted to be mounted in an opening of a standard cassette accommodating and erasure prevention tab, with the recorder/player being provided with a device for contacting the memory unit in such a manner that it can operate compatibly with the standard cassettes with both and without memory units.

2 Claims, 1 Drawing Sheet

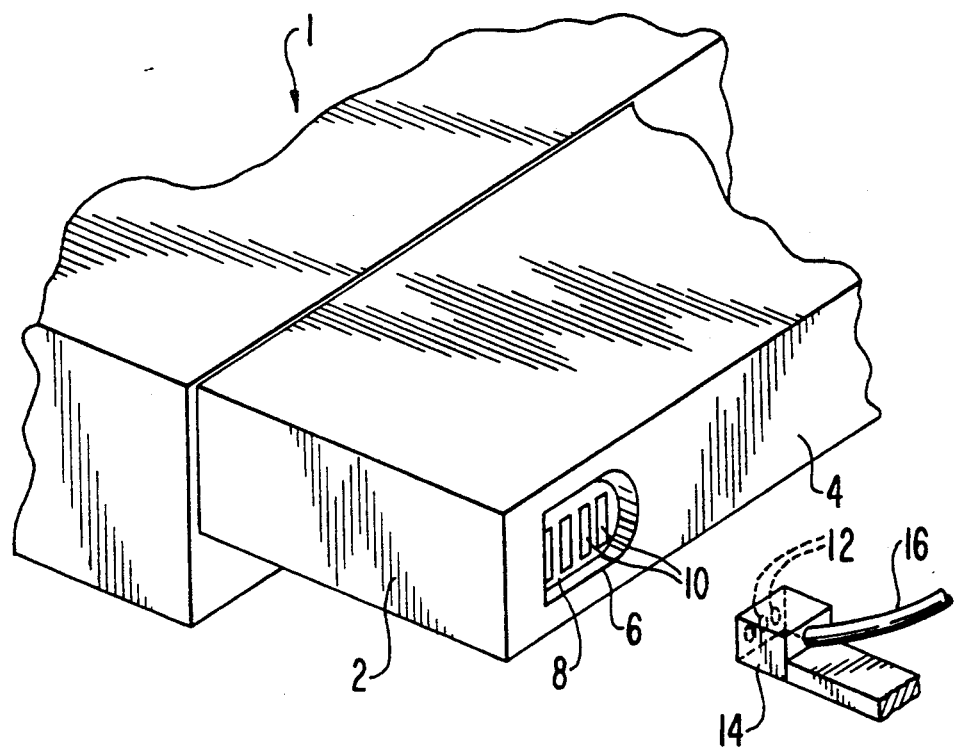

RECORDING AND/OR PLAY-BACK SYSTEM EMPLOYING A CASSETTE WITH A MEMORY UNIT ACCOMMODATED IN THE CASSETTE

FIELD OF THE INVENTION

The present invention relates to a recording and/or playback system, primarily a video system, with a recorder/player and associated cassette units with magnetic tape or a corresponding storage medium, and with the cassettes being provided with memory units that are independent of the storage medium and, by loading of the cassette into the recorder/player, operable to be brought into electrical connection with a read/write unit therein.

BACKGROUND OF THE INVENTION

A system of the aforementioned type offers great advantages with respect to exchange of information with the single cassettes themselves since information on the cassette can be read into and out from the memory unit fully independently of the ordinary recording and playing function and the tape position in the cassette. It is even possible to communicate with the cassette while the cassette, together with other cassettes, is placed in a storage rack having suitable terminals for contacting the respective member units, whereby, for example, it is possible to check the contents of all of the cassettes and thereby effect searches for desired program sequences. This can be of high importance for the professional world and, previous proposals as described in, for example, U.S. Pat. No. 4,426,684, use of the above noted technique with specially designed auxiliaries is proposed.

SUMMARY OF THE INVENTION

In connection with the invention it has been realized that a technique similar to the above described technique would be highly attractive also for use with quite ordinary equipment according to commercial standards, and it is also realized that considerable problems would arise in providing room for the required extra installations, as the space normally provided is minimum.

However, the invention is based on the consideration that this problem can be solved by utilizing memory units, that is, a programmed information to the effect that one or more sequences on just that tape must not be erased or be erasable. The control unit of the recorder can be adapted to automatically make recording or erasing impossible within tape counter intervals, which, with suitable identification, have been read into the associated memory unit, optionally with the use of a secret password, and in doing so it will then be possible to dispense with the use of the conventional erasure prevention tab of the cassette. The opening or hole accommodating the erasure prevention tab will be available as a permanent mounting space for the memory unit, without any change in the outer shape of the cassette or any other modification thereof.

Standard recorders are generally provided with means for pressing a sensor head against the area of the hole or opening conventionally accommodating the erasure prevention tab and, for this reason, only a minor mechanical modification of the standard recorders will be required in order to establish a contact between the memory units, as it is sufficient to provide the sensor head with the required contact terminals to be pressed against, for example, flat terminal areas on the exposed side of the memory unit in the hole or opening of the cassette accommodating the erasure prevention tab. The sensor head will still be able to carry on its usual function when cooperating with cassettes without a memory unit, that is, the system will be fully compatible.

It may have to be accepted that a partially or totally overplay protected tape can be overplayed if it is used in a non-modified standard recorder, but normally the users are extra aware of the protected cassettes, so that this disadvantage is believed to be of a minor importance compared with the substantial advantages offered by the system of the present invention.

It will be a significant development that these advantages are no longer reserved for narrow professional circles, but are achievable in an inexpensive and suitably manner in connection with the ordinary commercial equipment. The advantages and the possibilities of the system are not further described in more detail herein, as they have already been described, at least in principle, in U.S. Pat. No. 4,426,684. It should be noted only that memory units of cassettes for private use will not require any particular large capacity, as the tape will normally only hold few independent sequences.

The invention includes memory units which are designed for the relevant purpose, since old cassettes may be equipped with such units. Likewise, the invention will comprise recorders modified as disclosed hereinbelow.

BRIEF DESCRIPTION OF THE DRAWING

The Single FIGURE of the drawing is a schematic view of a corner of a video cassette constructed in accordance with the present invention for a recording/playback video system.

DETAILED DESCRIPTION

Referring now to the Single FIGURE of the drawing, according to this figure, a video cassette 2 adapted to be inserted into a recording and/or playing system generally designated by the reference numeral 1 includes a rear side 4 provided with a conventional erasure prevention arrangement including a hole or opening 6, which, on a new cassette for recording is provided with a removable breakable tab (not shown). In the drawing, the tab has been removed and replaced by an inserted block member 8 suitable secured in the hole or opening 6. The block 8 includes a memory unit and is provided with exposed flat contact strips 10 for contacting the memory unit. The memory unit may be of the type described, for example, in U.S. Pat. No. 4,426,684. To provide for reasonable protection of the exterior of the block 8 and the contact strips 10, both the exterior surface of the block 8 and the contact strips 10 are recessed or spaced from the rear side 4 defining an outer wall of the cassette 2.

The block 8 is shaped so as to fit into the hole or opening 6 for positioning the flat contact strips 10 in a well defined manner such that the contact strips 10 can be safely contacted by terminals 12 at the outer side of a conventional sensor head 14 used in a tape recorder for being moved in a direction of the hole or opening 6 for determining whether the removable cover tab is in tact or has been removed. Through a cable 16, the terminals 14 are connected to a control and reading unit (not shown) in the recorder, with the control and reading unit being of the type disclosed, for example, in U.S. Pat. No. 4,426,684.

Thus, the sensor head 14 is modified by the addition of the terminals 12 and the cable 16, but the mechanical and electrical function of the sensor head 14 need not be modified, since the block 11 will simulate the presence of the cover tab. Thus, it is possible to effect recording on the tape, with this possibility of effecting recording only being suspended by the information content of the memory unit. An ordinary cassette without the memory block 8 can still be used in the recorder in a fully conventional manner, as the sensor head 14 can still detect whether the cover tab is intact or has been removed.

The block 8 may be fastened, for example, by gluing or by spring barbs at one or more sides, enabling the block 8 to be mounted merely by pressing the block 8 into the hole or opening 6.

It will be appreciated that the contact strips 10 will be accessible for connection with the outer terminals also when the video cassette 2 is removed from the recording and/or playing system 1. Thus, a reading or editing of the contents of the memory unit will be possible, for example, with the use of a hand held connector device, whereby, optionally, a search can be carried out between more cassettes while another cassette is being played. Correspondingly, the user may communicate with more cassettes placed in a rack, in which a fixed connector unit corresponding to the sensor head 14 is provided adjacent to each hole or opening 6.

What is claimed is:

1. A recording and/or playing system the system comprising:
    a recorder/player;
    cassette units adapted to be inserted into said recorder/player and having a storing medium;
    memory units provided in said cassette units, said memory units being independent of the storing medium and being operable, in response to the cassette being inserted into the recorder/player, to be electrically connected with a read/write unit therein,
    wherein said memory unit is accommodated in a block member adapted to be mounted in an opening of a standard cassette adapted to accommodate an erasure protection tab, and
    wherein means are provided for contacting the memory unit in such a manner that it can operate compatibly with standard cassettes both with and without memory units.

2. A system according to claim 1, wherein connector terminals are provided on a side of said memory unit facing a sensor head of the system, and wherein terminals are provided on the sensor head for detecting whether the opening of the cassette is open or closed.

* * * * *